(12) United States Patent
Hirota et al.

(10) Patent No.: US 12,491,798 B2
(45) Date of Patent: Dec. 9, 2025

(54) VEHICLE-SEAT-SUPPORTING STRUCTURE

(71) Applicant: SUBARU CORPORATION, Tokyo (JP)

(72) Inventors: Yutaka Hirota, Tokyo (JP); Seiichiro Kuroki, Tokyo (JP); Tatsuya Narahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 7 days.

(21) Appl. No.: 18/519,755

(22) Filed: Nov. 27, 2023

(65) Prior Publication Data
US 2024/0198863 A1 Jun. 20, 2024

(30) Foreign Application Priority Data
Dec. 15, 2022 (JP) .................. 2022-200365

(51) Int. Cl.
| | |
|---|---|
| B60N 2/42 | (2006.01) |
| B60N 2/015 | (2006.01) |
| B62D 21/15 | (2006.01) |
| B62D 25/02 | (2006.01) |
| B62D 25/20 | (2006.01) |

(52) U.S. Cl.
CPC ........... B60N 2/015 (2013.01); B62D 21/157 (2013.01); B62D 25/025 (2013.01); B62D 25/2036 (2013.01)

(58) Field of Classification Search
CPC .......... B60N 2/015; B60N 2/005; B60N 2/50; B62D 21/157; B62D 25/025; B62D 25/2036; B62D 25/20; B62D 25/2009
See application file for complete search history.

(56) References Cited

U.S. PATENT DOCUMENTS

| | | | | |
|---|---|---|---|---|
| 5,967,604 | A | * 10/1999 | Yoshida ............. | B60N 2/42709 296/68.1 |
| 12,286,159 | B2 | * 4/2025 | Butukuri ............. | B62D 21/157 |
| 2015/0008703 | A1 | * 1/2015 | Furusaki ............. | B62D 25/025 296/187.08 |

FOREIGN PATENT DOCUMENTS

JP 2022-43808 A 3/2022

* cited by examiner

*Primary Examiner* — Amy J. Sterling
(74) *Attorney, Agent, or Firm* — MCGINN I.P. LAW GROUP, PLLC

(57) ABSTRACT

A vehicle-seat-supporting structure includes a floor panel, a side sill, front and rear floor cross members, and seat brackets. The side sill is disposed on an outer side of a vehicle body in a vehicle widthwise direction. The floor cross members are joined to the floor panel, extend in the vehicle widthwise direction, and each have one end facing the side sill with a gap in between. The seat brackets are joined to the respective one ends of the floor cross members and to the side sill. The seat brackets each include a supporting member joined to the floor cross member and supporting a seat, and a collapsible member interposed between and is joined to the side sill and the supporting member. The collapsible member includes a collapsing region that collapses inward in the vehicle widthwise direction when receiving an impact load from the side sill.

8 Claims, 7 Drawing Sheets

VEHICLE-SEAT-SUPPORTING STRUCTURE

CROSS-REFERENCE TO RELATED APPLICATIONS

The present application claims priority from Japanese Patent Application No. 2022-200365 filed on Dec. 15, 2022, the entire contents of which are hereby incorporated by reference.

BACKGROUND

The disclosure relates to a vehicle-seat-supporting structure including floor cross members each having an end coupled to a side sill with the aid of a seat bracket.

Front seats on which occupants are to sit are each attached to a pair of floor cross members with the aid of seat brackets. The pair of floor cross members are disposed at the front and the rear, respectively, of the front seat in such a manner as to extend parallel to each other. The two floor cross members each have a hat-like cross-sectional shape with flange parts on two respective sides thereof joined to a floor panel. One longitudinal end of the floor cross member is joined to a floor tunnel, which is located at the center of the vehicle in the vehicle widthwise direction. The other longitudinal end of the floor cross member is joined to one of side sills, which are disposed on two respective outer sides of the vehicle in the vehicle widthwise direction.

Since the front seat is supported by the pair of floor cross members with the aid of the seat brackets, if a side-on collision occurs, the impact load of the collision is transmitted from the side sill through the floor cross members toward the floor tunnel. The impact load is also transmitted through the seat brackets. Therefore, if the strength of the seat brackets is too high, the seat brackets are hindered from deforming, making it difficult to efficiently absorb the energy of the collision.

Furthermore, if the strength of the seat brackets is too high, the impact load generated in the side-on collision tilts the seat brackets into the vehicle cabin and twists the floor panel joined to the floor cross members. Consequently, the joints (spot-welded parts) between the floor panel and the floor cross members may be damaged.

As a countermeasure for the above situation, a technique has been disclosed by Japanese Unexamined Patent Application Publication (JP-A) No. 2022-43808, in which seat brackets are fixedly disposed near two respective longitudinal ends of a floor cross member, and the seat brackets each include beads at faces thereof that are on the vehicle front side and the vehicle rear side. The beads are formed through bending in such a manner as to each extend in the top-bottom direction.

With the technique disclosed by JP-A No. 2022-43808, when an impact load generated in a side-on collision is applied to the seat brackets, the beads located at the front and rear faces of the seat brackets and having bends undergo bending deformation, whereby the absorption of the energy of the collision is promoted.

SUMMARY

An aspect of the disclosure provides a vehicle-seat-supporting structure for a vehicle. The vehicle-seat-supporting structure includes a floor panel, a side sill, front and rear floor cross members in a pair, and seat brackets. The floor panel constitutes a floor of a vehicle body of the vehicle. The side sill is disposed on an outer side of the vehicle body in a vehicle widthwise direction of the vehicle and extends in a vehicle front-rear direction of the vehicle. The front and rear floor cross members are joined to the floor panel and each extend in the vehicle widthwise direction. The front and rear floor cross members each have one end that faces the side sill with a predetermined gap in between. The seat brackets are each joined to the one end of a corresponding one of the front and rear floor cross members and to the side sill. The seat brackets are configured to support a seat attached to top faces of the seat brackets. The seat brackets each include a supporting member and a collapsible member. The supporting member is joined to at least one of the front and rear floor cross members. The seat is attached to the supporting member. The collapsible member is interposed between the side sill and the supporting member and is joined to the side sill and the supporting member. The collapsible member includes a collapsing region. The collapsing region is configured to undergo collapsing deformation toward an inner side in the vehicle widthwise direction when receiving an impact load from the side sill.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

According to JP-A No. 2022-43808, the beads of the seat brackets are configured to undergo bending deformation when the floor cross member receives an impact load in a side-on collision, whereby a factor that hinders the deformation of the seat bracket is relieved.

The technique disclosed by JP-A No. 2022-43808 simply relieves a factor that hinders the deformation of the seat bracket by making the seat brackets easily bendable inward in the vehicle widthwise direction. Therefore, if the floor cross member is deformed under an impact load in a side-on collision, the floor panel joined to the flange parts of the floor cross member tends to be twisted. The occurrence of such a twist is difficult to reduce.

It is desirable to provide a vehicle-seat-supporting structure configured to reduce the occurrence of a twist in a floor panel by reducing the occurrence of deformation of each seat bracket that may receive an impact load in a side-on collision, and to efficiently absorb the impact load.

Embodiments of the disclosure will now be described with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, the term "join" is used to describe a joining technique of fusion boding, such as spot welding, to be performed with any welding device, unless otherwise stated.

First Embodiment

Figure 1:
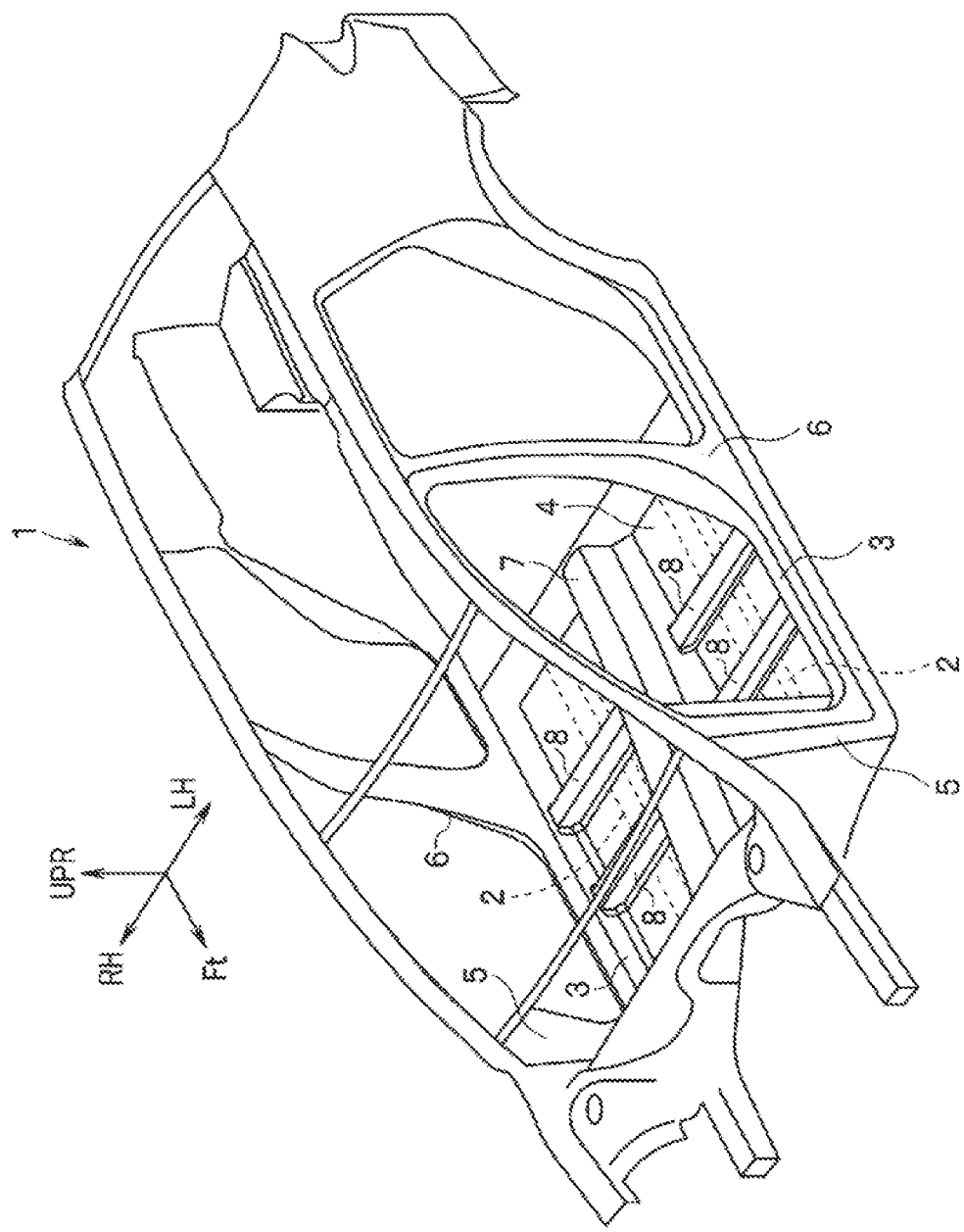
FIG. 1 is a schematic perspective view of a vehicle body according to an embodiment.

FIG. 1 illustrates a vehicle body 1, which forms the skeletal frame of a vehicle. The vehicle body 1 includes floor side frames 2, which are disposed at the bottom face of the vehicle body 1 on the respective left and right sides of the bottom face in the vehicle widthwise direction and each extend in the front-rear direction. The front ends of the floor side frames 2 are joined to a lower rear end of a kickup (not illustrated). The kickup extends obliquely in the top-bottom direction along an inclined toeboard (not illustrated).

The rear ends of the floor side frames 2 are joined to the front ends of respective rear side frames (not illustrated). The rear side frames extend toward the rear side of the vehicle body 1. The vehicle body 1 further includes side sills 3, which are disposed on two respective sides of the vehicle body 1 in the vehicle widthwise direction. As a matter of convenience, the following describes a front-seat-supporting structure disposed on the left side in the vehicle widthwise direction. A front-seat-supporting structure disposed on the right side in the vehicle widthwise direction is symmetrical to the front-seat-supporting structure disposed on the left side and is therefore not described herein.

Figure 2:
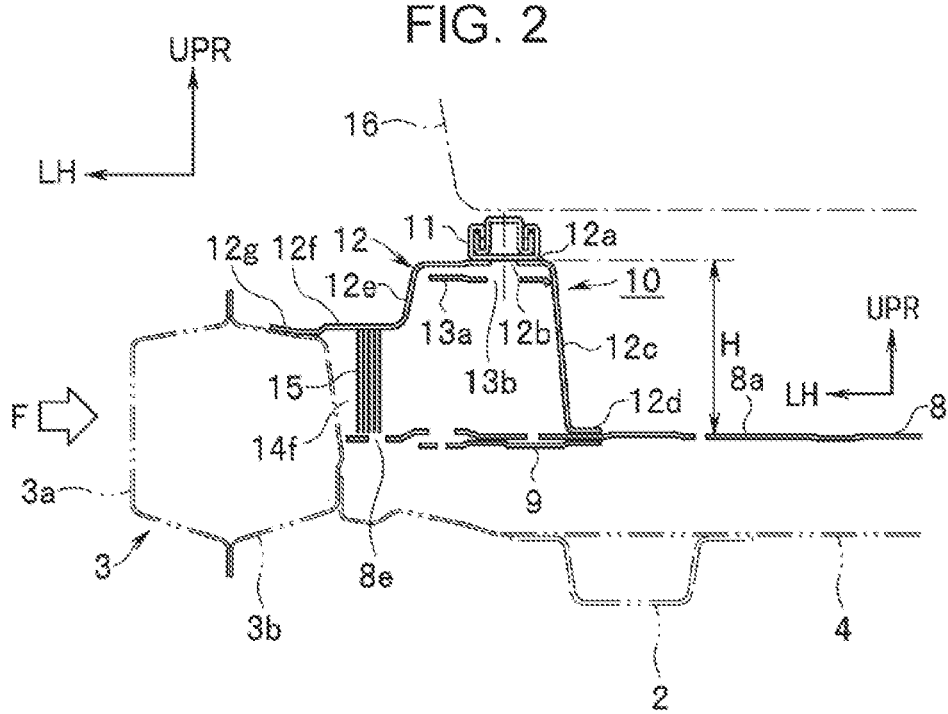
FIG. 2 is a longitudinal sectional view of a part of a front-seat-supporting structure according to the first embodiment that is disposed on the left side of the vehicle body.

Referring to FIG. 2, the side sills 3 each include a side-sill outer 3a and a side-sill inner 3b, which are each formed through bending in such a manner as to have a substantially hat-like cross-sectional shape with flanges formed at the upper and lower ends thereof. The side-sill outer 3a and the side-sill inner 3b are joined to each other at the upper and lower flanges. Thus, the side sill 3 has a closed cross section.

A floor panel 4 is disposed over and joined to the floor side frames 2, thereby forming the floor of the cabin. A floor tunnel 7 projects upward at the center of the floor panel 4 in the vehicle widthwise direction. The floor tunnel 7 is formed as a part of the floor panel 4 or is permanently affixed to the floor panel 4.

The left and right ends of the floor panel 4 in the vehicle widthwise direction are each joined to the side-sill inner 3b of a corresponding one of the side sills 3. Front pillars 5 and center pillars 6 are disposed on the left and right sides in the vehicle widthwise direction and are joined at the lower ends thereof to the side sills 3.

A pair of floor cross members 8 are disposed on a portion of the upper surface of the floor panel 4 that is located in the front cabin. The pair of floor cross members 8 are arranged at a predetermined interval in the front-rear direction and extend parallel to each other. The front and rear floor cross members 8 have the same configuration and are therefore described collectively by using a single reference number.

Figure 3:
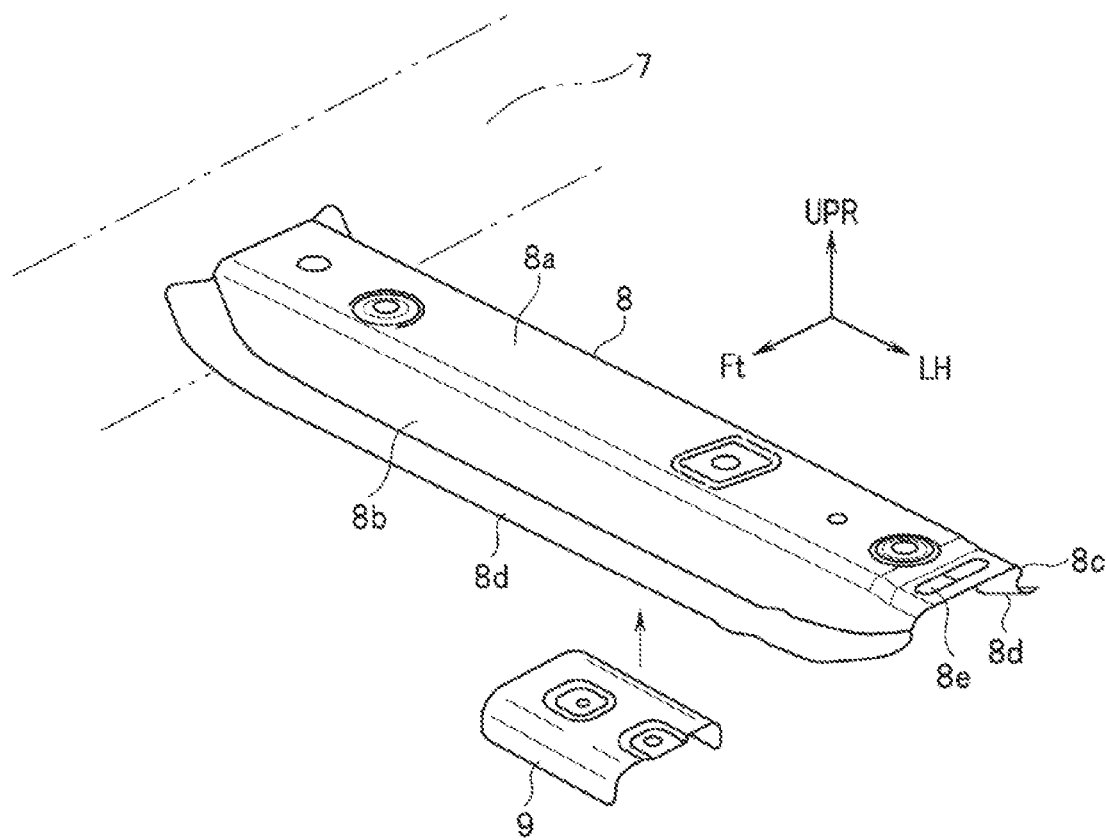
FIG. 3 is a perspective view of a floor cross member and a reinforcement according to the embodiment that are to be joined to each other.

Referring to FIG. 3, the floor cross member 8 is formed through bending to have a hat-like cross-sectional shape with a top face 8a, sidewalls 8b and 8c, and flanges 8d. The sidewalls 8b and 8c are located on the front and rear sides of the top face 8a. The flanges 8d are located at the lower ends of the respective sidewalls 8b and 8c. The flanges 8d are each joined to the floor panel 4 and to a flank of the floor tunnel 7. The left end and the right end of the floor cross member 8 face the side-sill inner 3b and the flank of the floor tunnel 7, respectively, without being joined thereto but with predetermined gaps in between.

The floor cross member 8 has a cut 8e, which is a narrow oblong hole. The cut 8e is located slightly inward relative to the left edge of the floor cross member 8 and extends in the front-rear direction of the vehicle body 1. The cut 8e serves as a fragile part included in the floor cross member 8 and intended to act at the time of side-on collision. The cut 8e is located in agreement with bead regions 15, which are included in a seat bracket 10 as to be described separately below. A reinforcement 9 is joined to the back surface of the floor cross member 8 in such a manner as to be located below the seat bracket 10 to be described below. The left end face of the reinforcement 9 is positioned slightly inward relative to the cut 8e of the floor cross member 8. The reinforcement 9 reinforces a portion of the floor cross member 8 that supports the below-described seat bracket 10.

Figure 4:
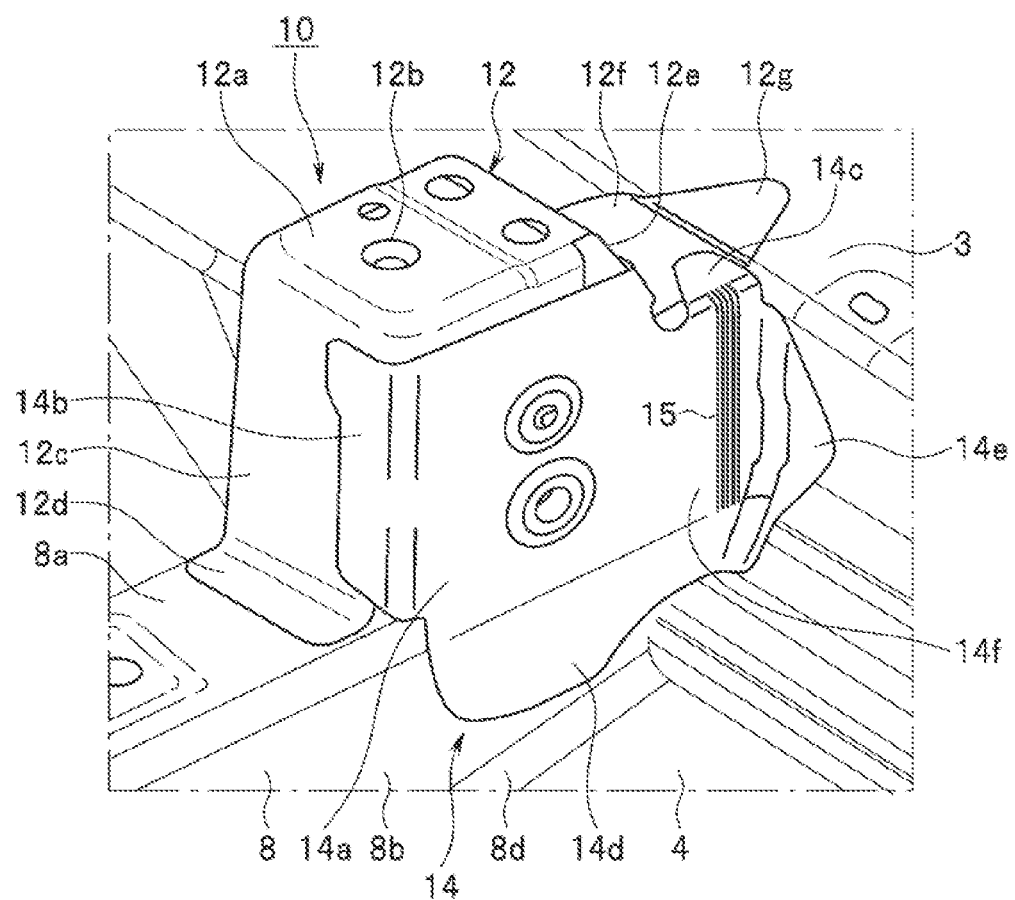
FIG. 4 is a perspective view of a seat bracket according to the embodiment, seen from the front side of the vehicle body.

Referring to FIGS. 2 and 4, the left end of the floor cross member 8 and the side-sill inner 3b are coupled to each other with the aid of the seat bracket 10. The configuration of the seat bracket disposed at the right end of the floor cross member 8 is not limited and is therefore not described herein.

A seat rail 11 is disposed on and over the seat brackets 10 provided for the front and rear floor cross members 8. A bolt (not illustrated) is made to extend through the seat rail 11 and a first member 12, to be described below, and is screwed into a free nut (not illustrated). The first member 12 is a constituent of the seat bracket 10 and has a bolt-receiving hole 12b, which receives the bolt. With the bolt screwed into the free nut, the seat rail 11 is fixed to the seat bracket 10.

Figure 5A:
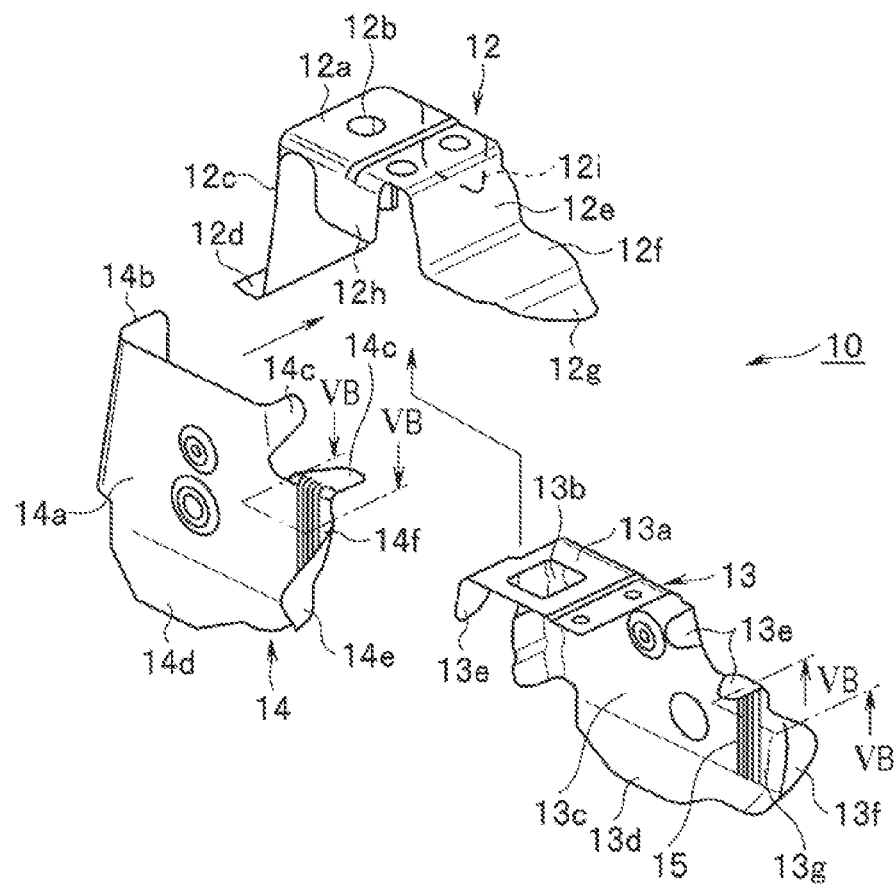
FIG. 5A is an exploded perspective view of the seat bracket according to the embodiment.

Referring to FIG. 5A, the seat bracket 10 includes the first member 12, a second member 13, and a third member 14, which are joined to be permanently affixed to one another. The first to third members 12 to 14 are each obtained by bending a steel plate. The first member 12 is made of a low-strength material that is thicker and more ductile than the second and third members 13 and 14. The first member 12 may serve as a supporting member in one embodiment. The second and third members may each serve as a collapsible member in one embodiment. Since the first member 12 is thicker than the second and third members 13 and 14, the below-described seat rail 11 is assuredly supported. Since the second and third members 13 and 14 are thinner than the first member 12, the below-described bead regions 15 are collapsible in a good manner.

Since the first member 12 is made of a low-strength material having a high ductility, if the bolt receives an impact load in a side-on collision and is about to come off the bolt-receiving hole 12b, the first member 12 is drawn out. Therefore, cracking around the bolt-receiving hole 12b is less likely to occur. The second and third members 13 and 14 may have the same thickness or may have different thicknesses that are varied with the characteristics thereof.

The first member 12 has a flat top face forming an attaching part 12a, to which the seat rail 11 is to be attached. The attaching part 12a has the bolt-receiving hole 12b.

The first member 12 further includes a longitudinal wall 12c, which is located on the inner side of the first member 12 in the vehicle widthwise direction. The longitudinal wall 12c is formed through bending and extends downward from the attaching part 12a. A lower end portion of the longitudinal wall 12c is bent to form a flange 12d, which is to be joined to the top face 8a of the floor cross member 8.

The first member 12 further includes a longitudinal wall 12e, which is located on the outer side of the first member 12 in the vehicle widthwise direction. The longitudinal wall 12e is formed through bending and extends downward from the attaching part 12a. A lower end portion of the longitudinal wall 12e is bent substantially horizontally to form an upper collapsible part 12f. The upper collapsible part 12f has at the distal end thereof a joining piece 12g, which is to be joined to the top face of the side-sill inner 3b. The first member 12 further includes joining parts 12h and 12i, which are located at the front and rear, respectively, of the attaching part 12a and are formed through bending.

The second member 13 includes a facing part 13a, which faces the lower surface of the attaching part 12a of the first member 12 with a predetermined gap in between. The facing part 13a has a nut-locking hole 13b. The nut-locking hole 13b is to lock the free nut to be screwed onto the bolt that is made to extend through the below-described seat rail 11.

The second member 13 further includes a rear sidewall 13c, which closes the rear side of the first member 12. The rear sidewall 13c is formed through bending and extends from the facing part 13a toward the rear sidewall 8c of the floor cross member 8. A lower end portion of the rear sidewall 13c forms a joining part 13d, which is to be joined to the rear sidewall 8c. The rear joining part 12i of the first member 12 is joined to the outer surface of the rear sidewall 13c. The second member 13 further includes joining pieces 13e, which are formed through bending in predetermined manners and are joined to the first member 12. The second member 13 further includes a flange 13f, which is formed through bending and extends along the outer edge, in the vehicle widthwise direction, of the rear sidewall 13c. The flange 13f is to be joined to the sidewall of the side-sill inner 3b.

Figure 5B:
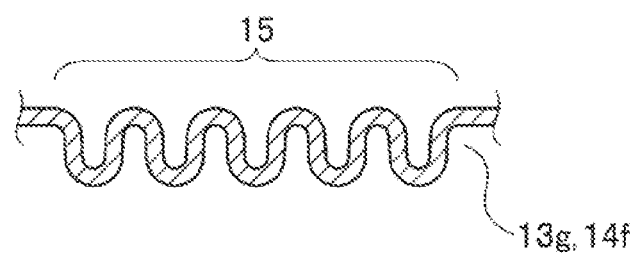
FIG. 5B illustrates a section taken along line VB-VB given in FIG. 5A.
Figure 6:
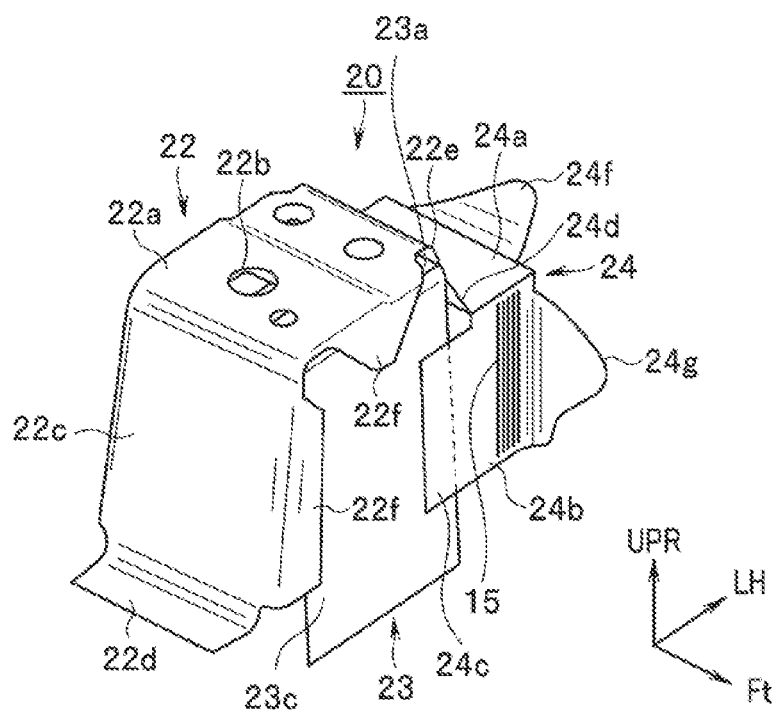
FIG. 6 is a perspective view of a seat bracket according to an embodiment.
Figure 7:
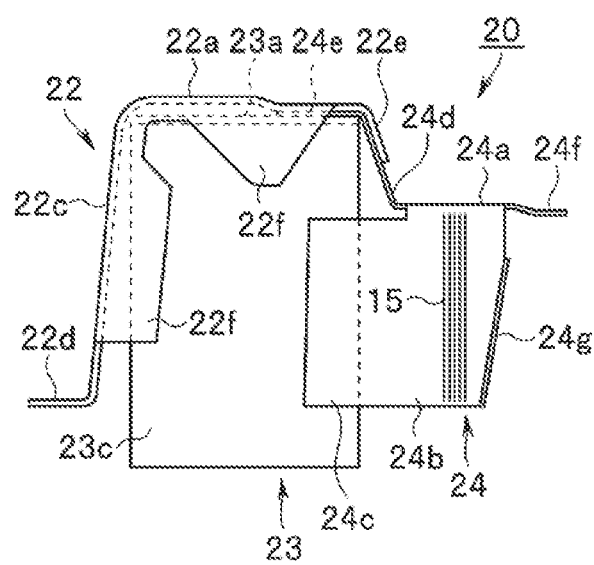
FIG. 7 is a front view of the seat bracket according to the embodiment.
Figure 8:
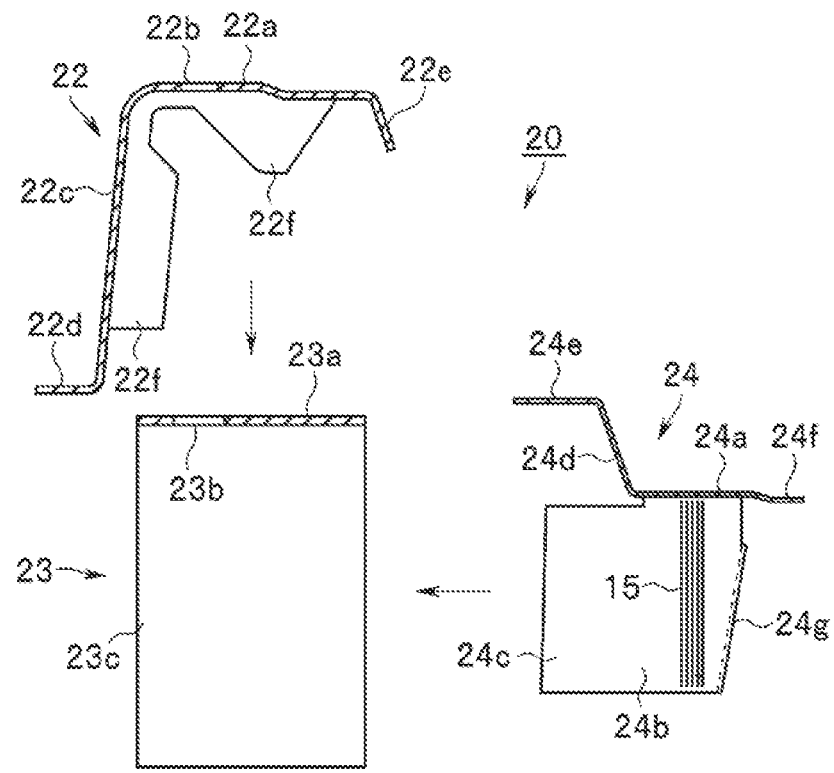
FIG. 8 is an exploded front view of the seat bracket according to the embodiment, illustrating a longitudinal section thereof.

As illustrated in FIG. 5A, the rear sidewall 13c includes a rear collapsible part 13g, which is located in agreement with the upper collapsible part 12f of the first member 12. The rear collapsible part 13g includes a bead region 15, which is formed through bending and may serve as a collapsing region in one embodiment. The bead region 15 includes multiple beads that are formed through bending in such a manner as to each extend in the top-bottom direction. As illustrated in FIG. 5B, the beads are formed at predetermined intervals in the vehicle widthwise direction and extend parallel to one another. Thus, the bead region 15 has a wavy shape.

The third member 14 includes a front sidewall 14a, which closes the front side of the first member 12. The front sidewall 14a is bent in a predetermined manner to have a joining part 14b and front joining parts 14c, which are joined to the first member 12. A lower end portion of the front sidewall 14a forms a flange 14d, which is to be joined to the front sidewall 8b of the floor cross member 8.

The front sidewall 14a is further bent to form a flange 14e, which extends from the outer edge, in the vehicle widthwise direction, of the front sidewall 14a and is to be joined to the sidewall of the side-sill inner 3b. As illustrated in FIG. 5A, the front sidewall 14a includes a front collapsible part 14f, which is located in agreement with the upper collapsible part 12f of the first member 12. The front collapsible part 14f includes a bead region 15, which is formed through bending. The bead region 15 is located and shaped symmetrically to the bead region 15 of the above-described second member 13.

As illustrated in FIG. 4, the seat bracket 10 constituted by the first to third members 12 to 14 that are joined to be permanently affixed to one another is joined to the top face 8a of the floor cross member 8 at the flange 12d of the first member 12. The joining part 13d of the second member 13 is joined to the rear sidewall 8c of the floor cross member 8. The flange 14d of the third member 14 is joined to the front sidewall 8b of the floor cross member 8.

The joining piece 12g of the first member 12 is joined to the top face of the side-sill inner 3b. The flanges 13f and 14e of the second and third members 13 and 14 are joined to the sidewall of the side-sill inner 3b. Thus, each of the front and rear floor cross members 8 is coupled to the side sill 3 with the aid of the seat bracket 10.

The seat rail 11 is fastened to the bottom face of a front seat 16 and is placed over the attaching parts 12a of the front and rear seat brackets 10. The bolts projecting downward through the seat rail 11 are inserted into the respective bolt-receiving holes 12b and are screwed into the respective free nuts that are locked at the respective nut-locking holes 13b. Thus, the bolts and the free nuts are fastened to each other, whereby the seat rail 11 is fixed to the seat brackets 10. If the seat rail 11 and the front seat 16 are each uniform among different models of vehicles, the above platform is employable among different models of vehicles by changing the height, H, from the top face 8a of the floor cross member 8 to the attaching part 12a of the seat bracket 10 in correspondence with the vehicle height.

Now, how the present embodiment works will be described. The first to third members 12 to 14 constituting the seat bracket 10 are joined to the side-sill inner 3b of the side sill 3 at the joining piece 12g and the flanges 13f and 14e. The side-sill inner 3b and the end of the floor cross member 8 are not joined to each other but face each other with a predetermined gap in between.

When the vehicle that is traveling or is under a collision test encounters a side-on collision with any solid object such as a pole (a utility pole, for example) and a corresponding impact load F is applied to the side sill 3 defining the front cabin, the side sill 3 deforms and pushes the seat bracket 10, joined to the side-sill inner 3b, inward in the vehicle widthwise direction.

The side-sill inner 3b and the end of the floor cross member 8 face each other with a predetermined gap in between. Therefore, the impact load F transmitted from the side-sill inner 3b first pushes the seat bracket 10 before being transmitted to the floor cross member 8.

The collapsible parts 13g and 14f located on the inner side, in the vehicle widthwise direction, of the flanges 13f and 14e of the second and third members 13 and 14 constituting the seat bracket 10 include the respective bead regions 15 each having a wavy shape with multiple beads each extending in the top-bottom direction (see FIG. 5B). Therefore, the bead regions 15 undergo collapsing deformation, and the upper collapsible part 12f of the first member 12 deforms simultaneously, whereby the impact load F is absorbed. With the presence of the bead regions 15, the direction of the collapse at the time of a side-on collision is made constant. Therefore, the transmission of the impact load F is easily controllable.

In the above process, the side-sill inner 3b moves inward in the vehicle widthwise direction and pushes the end face of the floor cross member 8. The floor cross member 8 has near the end face thereof the cut 8e located in agreement with the bead regions 15. Therefore, that portion of the floor cross member 8 at the end thereof collapses, without hindering the collapsing deformation of the collapsible parts 12f, 13g, and 14f of the seat bracket 10.

The seat bracket 10 is constituted by the first to third members 12 to 14 that are welded to be permanently affixed to one another. Therefore, the collapsing characteristics of the collapsible parts 12f, 13g, and 14f are individually settable to optimum values by selecting optimum thicknesses for the respective members 12 to 14 and optimum shapes for the respective bead regions 15 of the second and third members 13 and 14. Such settings may reduce the weight of the seat bracket 10.

When the side sill 3 receives an impact load F in a side-on collision, the bead regions 15 of the second and third members 13 and 14 and the upper collapsible part 12f of the first member 12 in the seat bracket 10 are caused to collapse. Therefore, the seat bracket 10 is less likely to tilt toward the vehicle cabin. Consequently, the floor cross member 8 is less likely to receive a forcible bending load that may occur with tilting of the seat bracket 10. Accordingly, the floor panel 4 is less likely to be twisted.

Furthermore, since the seat bracket 10 is less likely to tilt, the seat rail 11 fixed to the front seat 16 is less likely to tilt sideways. Therefore, the bolt that fastens the seat rail 11 to the attaching part 12a is less likely to come off the bolt-receiving hole 12b.

Furthermore, the seat bracket 10 has a three-piece structure constituted by the first to third members 12 to 14 and is configured to be less likely to tilt even under an impact load generated in a side-on collision. Therefore, the height H of the seat bracket 10 is allowed to be increased with low probability of being bound by restrictions set forth for presswork. Such a configuration leads to an increased variety of applicable vehicle models.

The third member 14 may be formed as a part of the second member 13 by extending and bending a front portion of the facing part 13a so that the seat bracket 10 constituted by two components is obtained. Such a configuration reduces the number of manufacturing steps.

Second Embodiment

FIGS. 6 to 9 illustrate a second embodiment of the disclosure. Elements according to the second embodiment are basically the same as in the first embodiment except a seat bracket 20, and are denoted by the same reference signs as in the first embodiment, omitting the detailed description thereof.

The seat bracket 20 according to the second embodiment includes first to third members 22 to 24, which are joined to be permanently affixed to one another. The first member 22 is made of a low-strength material that is thicker and more ductile than the second and third members 23 and 24. The first member 22 may serve as a supporting member in one embodiment. The third member 24 may serve as a collapsible member in one embodiment. Since the third member 24 is thinner than the first member 22, the bead region 15 is collapsible in a good manner.

The first member 22 has a flat top face forming an attaching part 22a, to which the seat rail 11 is to be attached. The attaching part 22a has a bolt-receiving hole 22b. The first member 22 further includes a longitudinal wall 22c, which is located on the inner side of the first member 22 in the vehicle widthwise direction. The longitudinal wall 22c is formed through bending and extends downward from the attaching part 22a. A lower end portion of the longitudinal wall 22c is bent to form a flange 22d, which is to be joined to the top face 8a of the floor cross member 8.

The first member 22 further includes a joining part 22e, which is located on the outer side of the first member 22 in the vehicle widthwise direction. The joining part 22e is formed through bending and extends obliquely downward from the attaching part 22a. The first member 22 further includes joining parts 22f, which are formed through bending and extend from the front and rear edges of the attaching part 22a and the longitudinal wall 22c.

The second member 23 has a U shape when seen in the vehicle widthwise direction, with the bottom thereof being open. The top face of the second member 23 forms a facing part 23a, which faces the lower surface of the attaching part 22a of the first member 22 with a predetermined gap in between. The facing part 23a has a nut-locking hole 23b, which is located to face the bolt-receiving hole 22b. The nut-locking hole 23b is to lock a free nut (not illustrated) to be screwed onto a bolt that is made to extend through the seat rail 11.

The second member 23 further includes front and rear sidewalls 23c, which are formed through bending and extend from the front and rear edges of the facing part 23a. The front and rear sidewalls 23c close the front and rear sides, respectively, of the first member 22. Lower end portions of the front and rear sidewalls 23c are to be joined to the front and rear sidewalls 8b and 8c of the floor cross member 8. The joining parts 22f of the first member 22 are joined to the front and rear sidewalls 23c.

The third member 24 is joined to a part of the second member 23 that is close to the side sill 3. The third member 24 has a U shape when seen from the side sill 3, with the bottom thereof being open. The top face of the third member 24 forms an upper collapsible part 24a. The third member 24 further includes front and rear collapsible parts 24b, which are formed through bending and extend from the front and rear edges of the upper collapsible part 24a.

The front and rear collapsible parts 24b include respective joining areas 24c, which are located at respective inner end portions, in the vehicle widthwise direction, of the front and rear collapsible parts 24b. The joining areas 24c are joined to the front and rear sidewalls 23c of the second member 23. The front and rear collapsible parts 24b further include respective bead regions 15, which are each the same as the bead region 15 according to the first embodiment (see FIG. 5B).

The third member 24 further includes a longitudinal wall 24d and a joining part 24e, which are formed through bending. The longitudinal wall 24d extends obliquely upward from the inner edge, in the vehicle widthwise direction, of the upper collapsible part 24a. The joining part 24e extends horizontally from the upper end of the longitudinal wall 24d. The joining part 22e of the first member 22 is joined to an upper portion of the longitudinal wall 24d. The joining part 24e is held between and joined to the attaching part 22a of the first member 22 and the facing part 23a of the second member 23.

The third member 24 further includes a joining piece 24f, which extends from the outer edge, in the vehicle widthwise direction, of the upper collapsible part 24a. The joining piece 24f is to be joined to the top face of the side-sill inner 3b. The third member 24 further includes flanges 24g, which are formed through bending and extend from the respective outer edges, in the vehicle widthwise direction, of the front and rear collapsible parts 24b. The flanges 24g are to be joined to the sidewall of the side-sill inner 3b.

Figure 9:
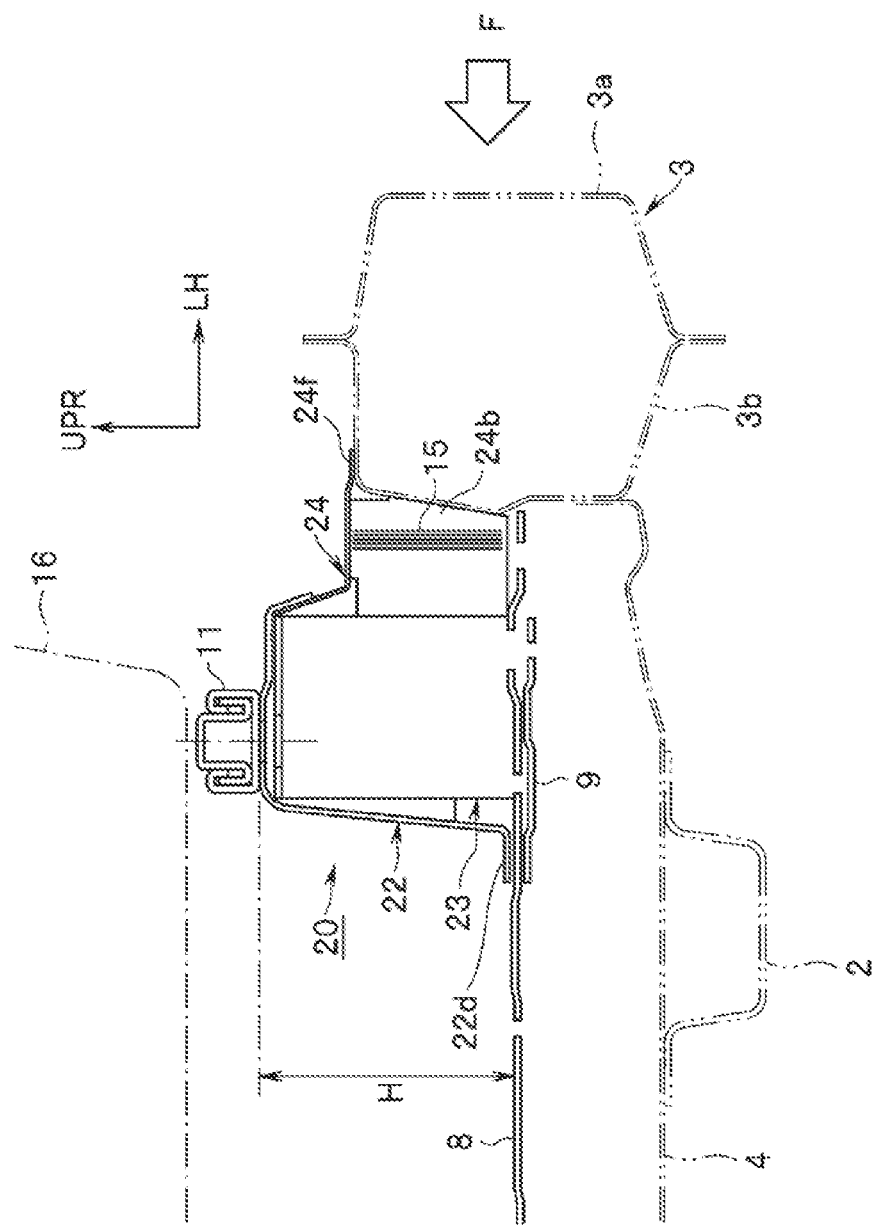
FIG. 9 is a longitudinal sectional view of a part of a front-seat-supporting structure according to the embodiment that is disposed on the left side of the vehicle body.

FIG. 9 illustrates a front-seat-supporting structure according to the second embodiment that is disposed on the left side of the vehicle body 1. As illustrated in FIG. 9, the seat bracket 20 constituted by the first to third members 22 to 24 that are joined to be permanently affixed to one another is joined to the top face 8a of the floor cross member 8 at the flange 22d of the first member 22 and to the front and rear sidewalls 8b and 8c (see FIG. 3) of the floor cross member 8 at lower end portions of the front and rear sidewalls 23c of the second member 23. Furthermore, the joining piece 24f and the flanges 24g of the third member 24 are joined to the side-sill inner 3b. The floor cross member 8 and the side-sill inner 3b are configured and positioned relative to each other in the same manner as in the first embodiment.

When a vehicle including the vehicle body 1 encounters a side-on collision with any solid object and a corresponding impact load F (see FIG. 9) deforms the side sill 3 defining the front cabin, the seat bracket 20 joined to the side-sill inner 3b is pushed inward in the vehicle widthwise direction.

Accordingly, the third member 24 of the seat bracket 20 joined to the side-sill inner 3b is pushed at the joining piece 24f and the flanges 24g thereof. The front and rear collapsible parts 24b of the third member 24 each include the wavy bead region 15 including multiple beads each extending in the top-bottom direction. Therefore, the bead region 15 receives the impact load F and collapses. Furthermore, the collapsible parts 24a and 24b of the third member 24 deform. Thus, the impact load F is absorbed.

In the second embodiment as well, the workings of the first embodiment are produced. Furthermore, since the third member 24 includes the upper collapsible part 24a and the front and rear collapsible parts 24b, the second member 23 has a simpler shape and is therefore easier to manufacture than in the first embodiment.

Furthermore, the third member 24 is responsible for undergoing collapsible deformation to absorb the impact load F. Therefore, if the thicknesses of the second member 23 and the third member 24 are made equal, the third member 24 may be formed as a part of the second member 23 through bending. In that case, the seat bracket 20 has a simple structure constituted by two components: the first member 22, and a member serving as the second member 23 and the third member 24.

The disclosure is not limited to the above embodiments. For example, the front-seat-supporting structure according to each of the above embodiments is also applicable to a front-wheel-drive vehicle that includes no floor tunnel 7 but includes a single pair of front and rear floor cross members disposed between the left and right side sills 3.

According to each of the embodiments of the disclosure, seat brackets are each joined to one end of a corresponding one of floor cross members and to a side sill. The seat brackets are configured to support a seat to be attached to top faces of the seat brackets. The seat brackets each include a supporting member and a collapsible member. The supporting member is joined to at least the floor cross member. The seat is to be attached to the supporting member. The collapsible member is interposed between the side sill and the supporting member and is joined to the side sill and the supporting member. The collapsible member includes a collapsing region. The collapsing region is configured to undergo collapsing deformation toward an inner side in the vehicle widthwise direction when receiving an impact load from the side sill. Therefore, when the side sill receives an impact load in a side-on collision, the collapsing region of the collapsible member included in the seat bracket undergoes collapsing deformation and absorbs the impact load. Consequently, the deformation of the seat bracket is less likely to occur, the twisting of the floor panel is therefore less likely to occur, and efficient absorption of the impact load is achieved.

The invention claimed is:

1. A vehicle-seat-supporting structure for a vehicle, the vehicle-seat-supporting structure comprising:
   a floor panel constituting a floor of a vehicle body of the vehicle;
   a side sill disposed on an outer side of the vehicle body in a vehicle widthwise direction of the vehicle and extending in a vehicle front-rear direction of the vehicle;
   front and rear floor cross members in a pair joined to the floor panel and each extending in the vehicle widthwise direction, the front and rear floor cross members each having one end that faces the side sill with a predetermined gap in between; and
   seat brackets each joined to the one end of a corresponding one of the front and rear floor cross members and to the side sill, the seat brackets being configured to support a seat attached to top faces of the seat brackets,
   wherein the seat brackets each comprise:
      a supporting member joined to at least one of the front and rear floor cross members, the seat attached the supporting member; and
      a collapsible member interposed between the side sill and the supporting member and joined to the side sill and the supporting member, and
   wherein the collapsible member comprises a collapsing region, the collapsing region being configured to undergo collapsing deformation toward an inner side in the vehicle widthwise direction when receiving an impact load from the side sill.

2. The vehicle-seat-supporting structure according to claim 1,
   wherein the collapsing region comprises beads arranged at predetermined intervals toward the inner side in the vehicle widthwise direction, the beads being formed through bending in such a manner as to each extend in a top-bottom direction.

3. The vehicle-seat-supporting structure according to claim 1,
   wherein the supporting member is made of a low-strength material having a high ductility.

4. The vehicle-seat-supporting structure according to claim 3,
   wherein the supporting member is thicker than the collapsible member.

5. The vehicle-seat-supporting structure according to claim 1,
   wherein the front and rear floor cross members each have a cut at a position in agreement with the collapsing region in the vehicle widthwise direction.

6. The vehicle-seat-supporting structure according to claim 2, wherein the front and rear floor cross members each have a cut at a position in agreement with the collapsing region in the vehicle widthwise direction.

7. The vehicle-seat-supporting structure according to claim 3,
wherein the front and rear floor cross members each have a cut at a position in agreement with the collapsing region in the vehicle widthwise direction.

8. The vehicle-seat-supporting structure according to claim 4,
wherein the front and rear floor cross members each have a cut at a position in agreement with the collapsing region in the vehicle widthwise direction.

* * * * *